United States Patent [19]
Gillespie et al.

[11] Patent Number: 5,859,987
[45] Date of Patent: Jan. 12, 1999

[54] METHOD AND APPARATUS FOR PROVIDING MULTIPLE CONFIGURATION RESET MODES FOR AN INTELLIGENT BRIDGE

[75] Inventors: Byron Gillespie, Phoenix; Barry Davis, Chandler, both of Ariz.

[73] Assignee: Intel Corporation, Santa Clara, Calif.

[21] Appl. No.: 536,156

[22] Filed: Sep. 29, 1995

[51] Int. Cl.[6] ........................................... G06F 13/40
[52] U.S. Cl. ............................................. 395/308; 395/284
[58] Field of Search ................................. 395/308, 306, 395/280, 281, 284

[56] References Cited

U.S. PATENT DOCUMENTS

| | | | |
|---|---|---|---|
| 5,548,730 | 8/1996 | Young et al. | 395/280 |
| 5,568,619 | 10/1996 | Blackledge et al. | 395/281 |
| 5,608,876 | 3/1997 | Cohen et al. | 395/281 |

*Primary Examiner*—Jack B. Harvey
*Assistant Examiner*—Jigar Pancholi
*Attorney, Agent, or Firm*—Blakely, Sokoloff, Taylor & Zafman

[57] ABSTRACT

An integrated circuit for providing multiple configuration modes in a multi-funtion intelligent bridge that includes an integrated processor. A first circuit, coupled to a first external bus, for selectively generating retry cycles onto the first external bus in response to a retry signal is provided. A second circuit, coupled to a local processor, for selectively resetting a local processor that is integrated in the intelligent bridge in response to a reset signal is provided. The first and second circuit, in conjunction with the retry signal and the reset signal, selectively provides one of a multiple number of configuration reset modes for the multi-function intelligent bridge.

13 Claims, 11 Drawing Sheets

METHOD AND APPARATUS FOR PROVIDING MULTIPLE CONFIGURATION RESET MODES FOR AN INTELLIGENT BRIDGE

BACKGROUND OF THE INVENTION

(1) Field of the Invention

This invention relates to computer systems, and, in particular, to a method and apparatus for providing multiple configuration modes to an intelligent PCI to PCI bridge.

(2) Prior Art

When a computer system is reset, a host processor of the computer system begins an initialization process. This initialization process includes initializing the values of registers to a predetermined value and also initializing the state machines to a known state. Once a host processor completes its initialization sequence, the host processor proceeds to configure the various other devices connected in the computer system.

For example, in a computer system employing a bus having a protocol, as defined by PCI Bus Protocol, the host processor configures each PCI compliant device by reading and writing the configuration registers in that device. First, the host processor reads the configuration space of each PCI compliant device to gather information concerning the device. The host then proceeds to assign the device a device number, a bus number, a portion of PCI address space, and interrupt lines.

FIG. 1 illustrates a prior art PCI compliant Intelligent Computer Add-in Card 3. This Computer Card 3 is coupled to a PCI bus slot 5 that is disposed on a backplane or a motherboard. This Computer Card 3 includes a PCI to Processor Bus Bridge that interfaces a PCI bus 9 to a Local Processor bus 11. The PCI to Local Processor Bus Bridge 7 may be implemented by the PLX 9060 chip or the V39XPCI chip. A processor 13 is coupled to the Local Processor Bus 11. This processor 13 is referred to as a "local processor" to distinguish it from the main system processor or "host processor." The Local Processor Bus 11 is also coupled to Dynamic Random Access Memory (DRAMs) and a Read Only Memory (ROM) 17 via a Memory Controller 21. The Memory Controller 21 controls accesses to the RAM 15 and the ROM 17. The Local Processor Bus 11 is also coupled to one or more input/output (I/O) devices 23 that are compliant to the protocol of the Local Processor Bus 11.

Upon system reset, the Computer Card 3 receives a P_RST# signal 25 from the host processor 27. The PCI to Local Processor Bus Bridge 7 translates the P_RST# signal 25 into a RST# signal to reset the local processor 13.

A requirement of the PCI bus protocol is that each PCI bus compliant device have a configuration space. This configuration space must include a predetermined header containing predetermined fields of information (i.e., registers that include specific information, such as, device type, vendor ID) so that the host processor, when configuring the computer system, can easily identify the PCI device and also identify its memory requirements and its processing needs.

To fulfill this requirement, the prior art includes a serial EEPROM 31 that contains the configuration information required by the PCI bus protocol. Upon receipt of the P_RST# signal 25, the configuration information stored in a serial EEPROM 31 is sent to a plurality of Configuration Registers 33 that are implemented as part of the PCI to Local Processor Bus Bridge 7.

Upon receiving the RST# signal 29, the local processor 13 begins to execute initialization software that initializes the internal registers of the local processor 13, the Memory Controller 21, Local Processor Bridge 7, and other devices in the Computer Card 3. The P-RST# signal 25 also initializes the state machines in the Computer Card 3 into a known state.

Since there are two concurrent initialization sequences occurring upon reset (i.e., the initialization for the host processor and the initialization for the local processor), a synchronization issue arises. For example, if the host processor completes its initialization sequence and begins a PCI configuration cycle before the serial EEPROM 31 downloads the pertinent information into the Configuration Registers 33 in the PCI to Local Processor Bus Bridge 7, Computer Card 3 would not be recognized by the host processor. In fact, in the prior art, there is no mechanism to guarantee that the Configuration Registers 33 are written with the appropriate information before a host processor attempts to configure the Computer Card 3. Accordingly, there is a need for a method and apparatus to guarantee that the PCI configuration space, as implemented with the Configuration Registers 33, are loaded with the appropriate information before a host processor reads these Configuration Registers 33.

Another disadvantage of the prior art is that additional board space and increased system costs for providing a serial EEPROM component 31 are incurred. This additional overhead is compounded when a computer system is configured with the components of the Computer Card 3, disposed on the baseboard or motherboard. Accordingly, a method and apparatus for guaranteeing synchronization of a reset sequence without a serial EEPROM component 31 is desirable.

Another disadvantage of the prior art is the uncertainty of synchronizing a reset sequence by streamlining the initialization software executed by the local processor 13. In other words, the prior art approach merely optimizes the initialization code that is executed by the Local Processor 13 so as to increase the probability that the local processor initialization completes before the host processor reads the configuration space of the computer card 3. As noted previously, this current approach to the synchronization problem is not a guarantee that the local processor 13 will complete its own initialization before a Host Processor 27 completes its initialization sequence. Thus, this prior art method is unpredictable and dependent on the time that the host processor requires for its initialization sequence before reading the PCI configuration registers of the Computer Card 3.

In summary, streamlining the initialization software that executes on local processor 13, so that the local processor 13 can initialize the PCI Configuration Space 33 prior to a Host Processor 27 reading the Configuration Registers, is inadequate and unpredictable since this solution is dependent on the time required by the host processor to finish its initialization sequence. Additionally, the solution of providing a serial EEPROM 31 to download information into the PCI configuration space 33 of the PCI to Local Processor Bus Bridge 7 is also inadequate and non-optimal in that the solution is still unpredictable and dependent on the initialization sequence time required by the host processor to complete initialization. This approach also incurs additional system costs and also board space.

Accordingly, there is a need for a method and apparatus for providing multi-configuration modes to an intelligent multi-function bridge.

BRIEF SUMMARY OF THE INVENTION

A method and apparatus for providing multiple-configuration reset modes to an intelligent bridge is described herein. The present invention provides these multiple-configuration reset modes so that an architectural system designer has the flexibility to initialize an intelligent I/O subsystem by using an intelligent bridge. An intelligent I/O subsystem, employing an intelligent bridge, includes an embedded microprocessor, memory, PCI devices or subsystems, and a PCI interface that contains a PCI configuration space. This PCI configuration space includes registers that are used to identify the PCI device or subsystem. During system initialization, the host processor reads these configuration registers to notify the host processor of the system configuration. The present invention enables this configuration space to be initialized by the intelligent bridge prior to the host processor reading the configuration registers, so that the intelligent I/O subsystem takes the appearance of any PCI device or subsystem when the host processor reads the registers.

Furthermore, the present invention allows an embedded system to contain Random Access Memory (RAM) only. The present invention obviates the need for a Read Only Memory (ROM) by allowing the host processor to initialize the embedded system and also to download code from a host memory to the embedded RAM in the subsystem.

Moreover, the present invention controls the reset sequence of the intelligent I/O subsystem on the intelligent bridge. The present invention also guarantees the synchronization of the initialization sequence between the integrated processor in the intelligent bridge and the host processor.

BRIEF DESCRIPTION OF THE DRAWINGS

The objects, features and advantages of the present invention will be apparent to one skilled in the art in light of the following detailed description in which.

DETAILED DESCRIPTION OF THE INVENTION

Referring to the figures, exemplary embodiments of the invention will now be described. The exemplary embodiments are provided to illustrate the aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
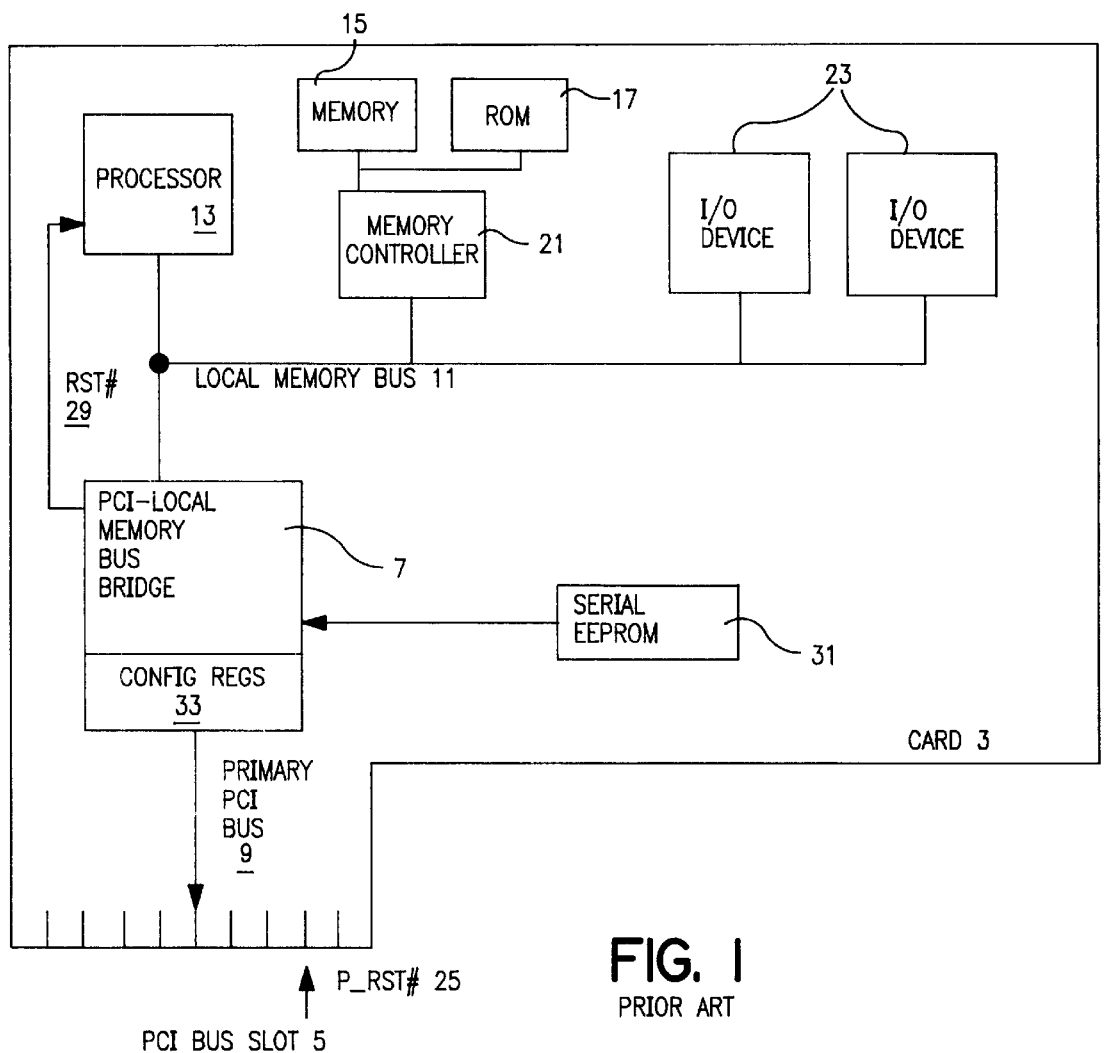
FIG. 1 illustrates a prior art computer system.
Figure 2:
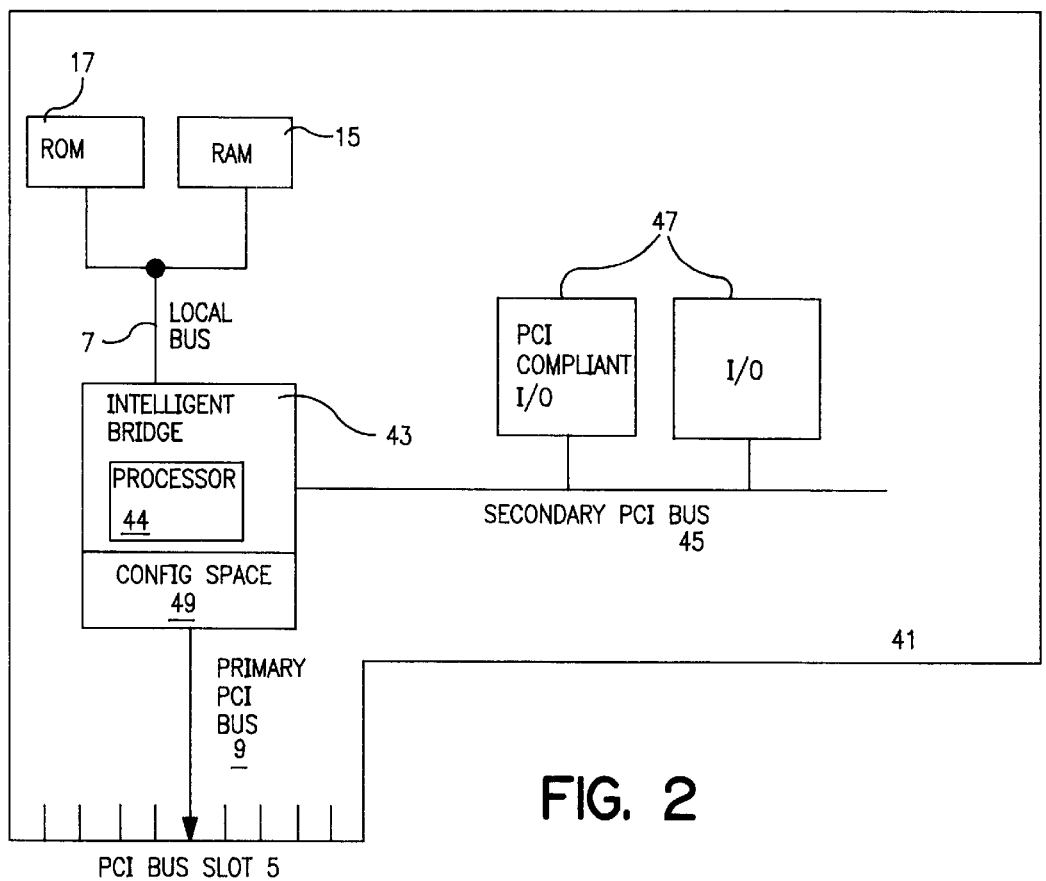
FIG. 2 illustrates a computer system in which the present invention may be implemented.

FIG. 2 illustrates a computer system in which the present invention may be implemented. The circuit components illustrated in FIG. 2 may be implemented on a computer card 41 or on the motherboard or baseboard (not shown). This computer system 41 includes an intelligent bridge 43 having an integrated processor 44. The intelligent bridge 43 performs the following functions. First, the intelligent bridge 43 interfaces the primary PCI bus 9 with a secondary PCI bus 45. For example, the intelligent bridge 43 translates primary PCI bus cycles into corresponding secondary PCI bus cycles and vice-versa. The secondary PCI bus 45 may have a plurality of I/O devices 47 that are PCI-compliant coupled to it.

The integrated processor 44 is coupled to a local processor bus 7. A memory (e.g., Random Access Memory) 15 and a ROM (Read Only Memory) 17 are coupled to the intelligent bridge 43 through the local processor bus 7.

The intelligent bridge 43 also includes the required configuration space 49, as defined by the PCI bus protocol. This configuration space 49 includes a plurality of configuration registers that include information which defines the functions provided by the intelligent bridge 43. The present invention allows for configuration information stored in the ROM 17 to be downloaded into the configuration registers 49 by processor 44. Moreover, ROM 117 may include boot code that is executed by the integrated processor 44 after the local processor's reset initialization sequence.

Figure 3:
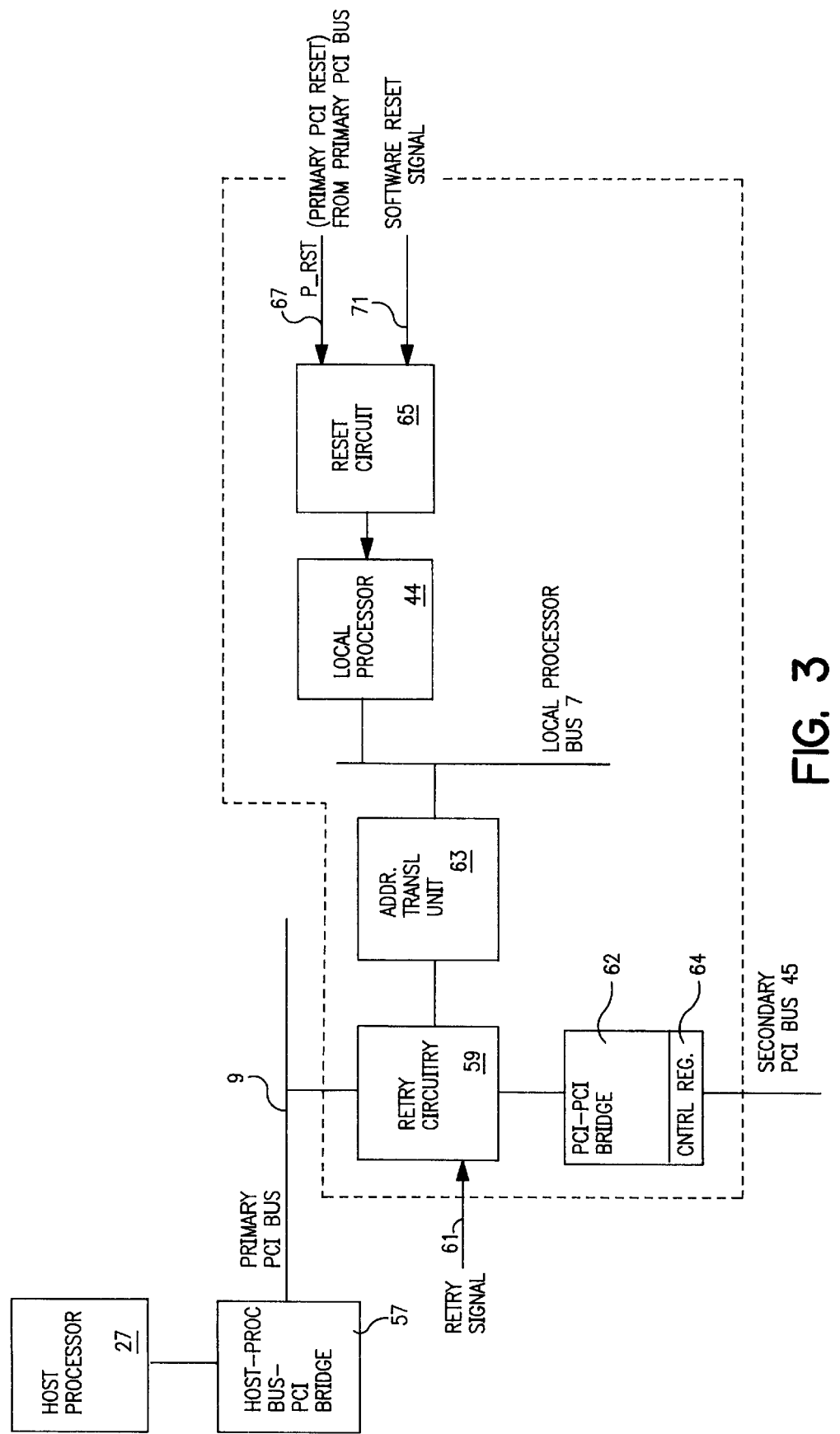
FIG. 3 illustrates further details of the present invention in block diagram form, as implemented in a multi-function intelligent bridge.

FIG. 3 illustrates a block diagram of the present invention implemented in an exemplary computer system. A host processor 27 is coupled to a host processor bus-PCI bus bridge 57. This bridge 57 provides an interface between the host processor bus and a primary PCI bus 9. The bridge 57 also controls accesses to the main memory and a cache of the computer system (not shown).

As noted previously, the present invention may be implemented in the intelligent bridge 43. The intelligent bridge 43 includes a PCI to PCI bridge 62 having a plurality of control registers 64. The PCI to PCI bridge 62 translates the primary PCI bus cycles into secondary PCI bus cycles and vice versa. The intelligent bridge 43 also includes an address translation unit (ATU) 63 that translates primary PCI bus cycles into local processor bus cycles and vice versa. A local processor 44 is coupled to the ATU 63 via the local processor bus 7.

The present invention includes two key components. First, a Retry circuitry 59 is coupled to the primary PCI bus 9, the ATU 63, and the PCI to PCI bridge 62. The Retry circuitry 59 includes an input for receiving a Retry signal 61. In response to an asserted Retry signal 61, the Retry circuitry 59 generates a Retry cycle on the primary PCI bus 9. This PCI Retry cycle notifies the host processor 27 to repeat the current instruction at a later time. Second, the present invention includes a reset circuit 65, coupled to the local processor 44. This reset circuit includes an input for receiving the P_RST signal 67 (i.e., Primary PCI Reset signal), a hardware reset signal 69, and a software reset signal 71. In response to receiving any one of an asserted P_RST# signal 67, and an asserted software reset signal 71, the reset circuit 65 resets the intelligent bridge and optionally continues to hold the local processor 44 in a reset state. If none of the inputs provided to the reset circuitry 65 are asserted, the local processor 44 is brought out of the reset state.

Figure 4:
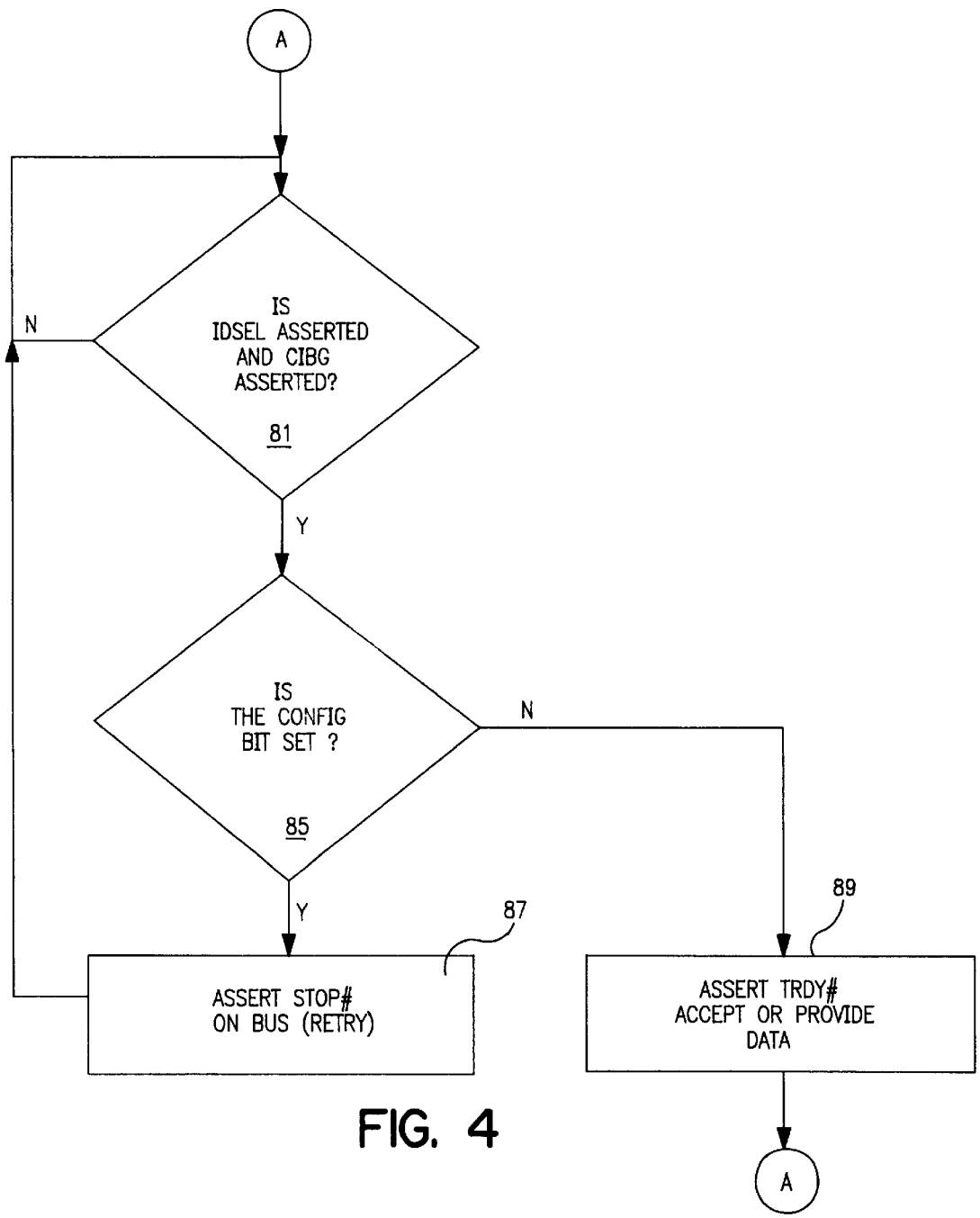
FIG. 4 illustrates a flowchart of the processing steps carried out by a retry circuit.

FIG. 4 illustrates a flowchart of the processing steps followed by the Retry circuitry 59 of FIG. 3. First, a determination is made whether both the IDSEL signal and a C/BE# (Command/Byte Enable) signal are asserted (decision block 81) An asserted IDSEL signal indicates that the intelligent bridge 43 is the selected device, and the asserted C/BE# indicates that a configuration cycle is detected on the primary PCI bus. If not, continue checking the IDSEL signal and the C/BE# signal. If yes, the Retry circuitry 59 determines if a Configuration Cycle Retry Bit is asserted (decision block 85). If yes, the Retry circuit 59 asserts a STOP# signal on the primary PCI bus 9. Asserting the STOP# signal indicates to the requesting processor that the intelligent bridge 43 is not ready and to retry at a later time. If no, the Retry circuitry 59 asserts TRDY# and accepts data for a write instruction and provides data for a read instruction. An asserted TRDY# signal (i.e., a Target Ready signal) indicates to the requesting processor that the intelligent bridge 43 is ready to process the current request. The Configuration Cycle Retry Bit, as will be described hereinafter, may be a bit in a control register 64, residing in the PCI-to-PCI bridge 62.

Figure 5:
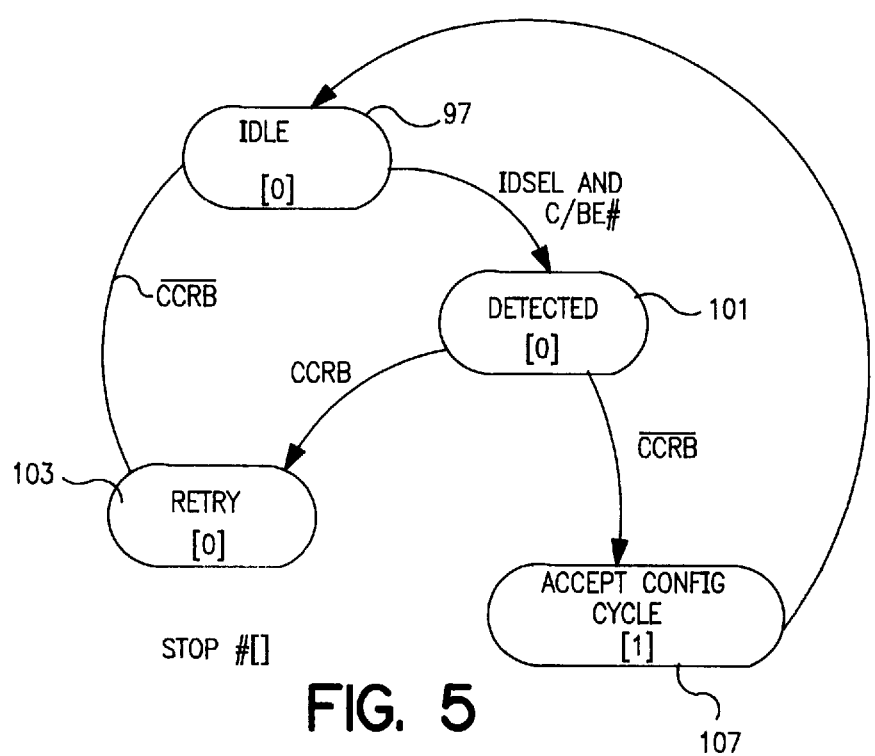
FIG. 5 illustrates a state diagram for the retry circuitry.

FIG. 5 illustrates a state diagram for the Retry circuitry of FIG. 3. The Retry circuitry 69 transitions from an Idle state 97 into a Configuration Cycle Detected state 101 when the IDSEL signal is asserted and the C/BE# signal is asserted. The output of the Retry circuitry STOP# is not asserted in the Configuration Cycle Detected state.

The Retry circuitry 59 transitions from the Configuration Cycle Detected state 101 into the accepted state 107 when the Configuration Cycle Retry Bit (CCRB) is not asserted. In the Accepted state 107, data to be written from the PCI bus is latched and appropriate data is returned in response to a read instruction. Data can be written to the configuration registers, through the bridge, or to local memory. In the Accepted state 107, the TRDY# signal is asserted, and the STOP# signal is never asserted. After the configuration cycle is completed, the Retry circuitry 59 transitions from the Accepted state 107 back to the Idle state 107.

The Configuration Cycle Detected state 101 transitions to the Retry state 103 if the CCRB is asserted. In the Retry state 103, the Retry circuitry 59 asserts a STOP# signal. Furthermore, a STOP# signal is asserted, and the TRDY# signal is never asserted. The Retry circuitry 59 transitions from the Retry state 103 back to the Idle state 97 when the CCRB is de-asserted.

Figure 6:
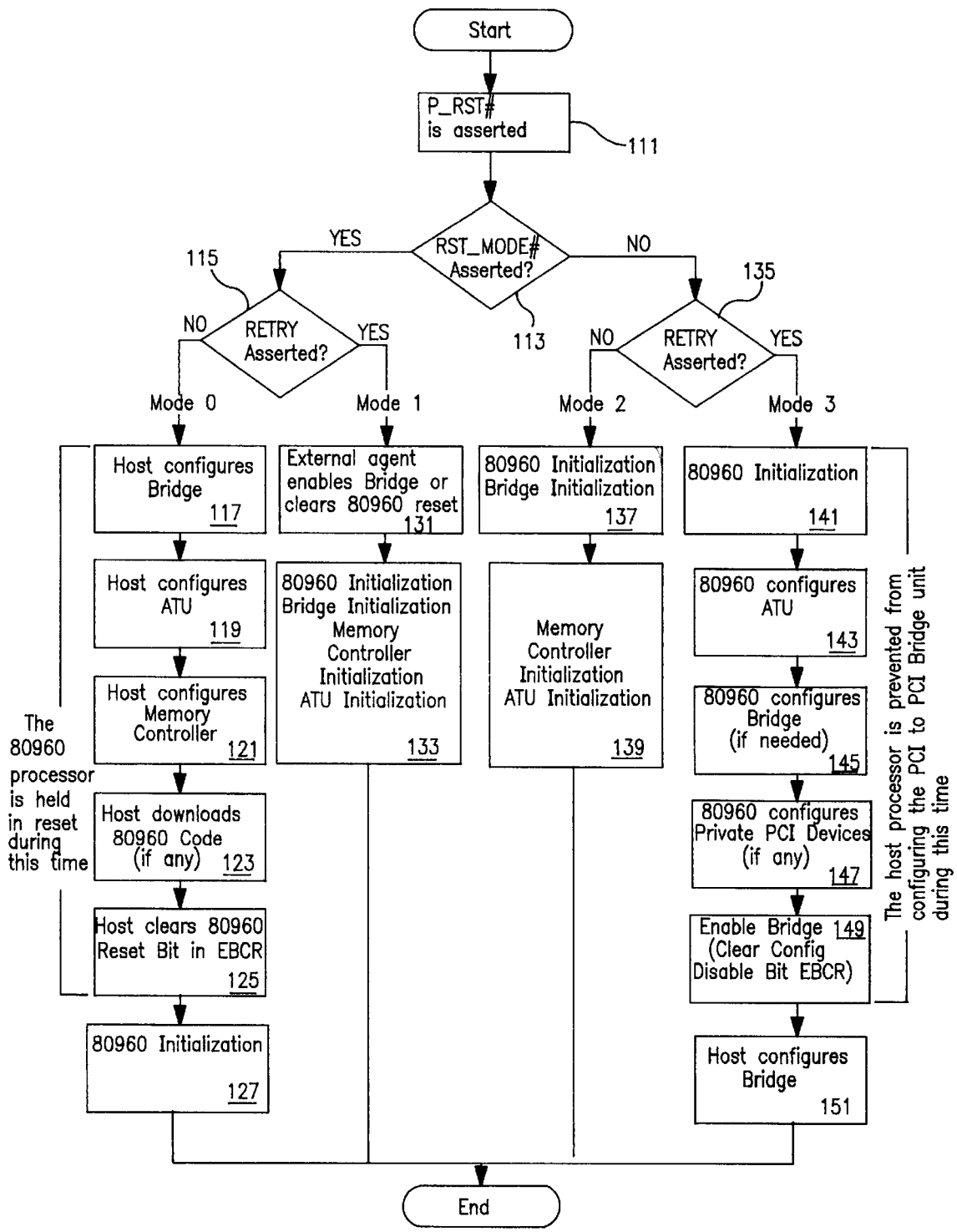
FIG. 6 illustrates a flowchart of how the various configuration reset modes of the intelligent bridge are selectively activated.

FIG. 6 illustrates how the different configuration reset modes of the intelligent bridge 43 are selectively determined. The intelligent bridge 43 includes several units that require initialization before system operation. The order in which these units are initialized is important and is dependent on the system design. There is no one single initialization process for the intelligent bridge 43. The present invention provides several options that are determined and controlled by the system designer.

As noted previously, several units in the intelligent bridge 43 need to be initialized before system operation. For example, the PCI-to-PCI bridge 62, the ATU 63, the local processor 44 all require initialization before system operation. The order in which these units are initialized is dependent on how the intelligent bridge 43 is being used in the system. Four initialization options are provided by the present invention. The initialization options will be described hereinafter.

The initialization process begins when the Primary PCI Bus Reset signal (P_RST#) is asserted. The initialization process is generally controlled through either the host processor 27 or the local processor 44. The present invention provides four initialization modes (also referred to herein as configuration reset modes). These modes are denoted Modes 0–3. The particular mode is determined by the value of two signal pins: RST_MODE# and RETRY.

The RST_MODE# signal pin is sampled when P_RST# is de-asserted, i.e., on the rising edge. The inverse value of this signal is then written to the 80960 Processor Reset bit in the Extended Bridge Control Register (EBCR). If RST_MODE# is active when P_RST# is de-asserted, then the 80960 JF processor will be held in reset until the 80960 Processor Reset bit in the EBCR is cleared. If the RST_MODE# is inactive when P_RST# is de-asserted, the 80960 JF processor is reset and then begins its normal initialization sequence when P_RST# is de-asserted.

The RETRY signal pin is also sampled when P_RST# is de-asserted. The value of this signal is written to the Configuration Cycle Disable Bit in the EBCR. If RETRY is active when P_RST# is de-asserted, the Retry circuitry 59 signals a retry on all PCI cycles it receives on the primary PCI bus. If RETRY is inactive when P_RST# is asserted, the Retry circuitry 59 accepts PCI cycles on the primary PCI bus.

Table 1 describes the relationship between the RST_MODE# and RETRY values and the initialization modes.

TABLE 1

| RST_MODE # | RETRY | Initialization Mode | Primary PCI Interface | 80960 JF Processor |
| --- | --- | --- | --- | --- |
| 0 | 0 | Mode 0 | Accepts transactions | Held in Reset |
| 0 | 1 | Mode 1 | Retry all configuration transactions | Held in Reset |
| 1 | 0 | Mode 2 | Accepts transactions | Initializes |
| 1 | 1 | Mode 3 | Retry all configuration transactions | Initializes |

Each of these modes will now be briefly described. Mode 0 allows a host processor 27 to configure the intelligent bridge 43 through the primary PCI bus 9, while the local processor 44 is held in reset. The host processor 27 initializes and configures the intelligent bridge 43, downloads any code required by the local processor 44, and then clears the reset condition of the local processor 44. The local processor 44 then initializes and begins operation.

Mode 1 allows an external agent (e.g., a second processor downstream of the intelligent bridge) to initialize the intelligent bridge 43. The local processor 44 is again held in reset, and the host processor 27 is prevented from initializing the intelligent bridge 43 through the primary PCI bus 9. In Mode 1, the external agent clears the reset condition of the local processor 44 or enables the PCI transactions on the primary PCI bus 9.

Mode 2 allows PCI transactions on the primary PCI interface, which is disposed in the PCI to PCI bridge 62, at any time and allows the local processor 44 to initialize after receiving the P_RST# signal.

Mode 3 allows the local processor 44 to initialize and then to control the intelligent bridge 43 and initialization process before a host processor 27 is allowed to configure the intelligent bridge 43. The host processor 27 is prevented from initializing the intelligent bridge 43 through the primary PCI bus 9 until the local processor 44 initializes and clears the Configuration Cycle Disable bit in the EBCR. In Mode 3, a system designer must provide an initialization ROM (Read Only Memory) that stores initialization code to be executed by the local processor 44. This initialization software also downloads the appropriate configuration information into the configuration registers of the intelligent bridge 43.

FIG. 6 illustrates in greater detail each of the configuration reset modes.

(Mode 0 Download Mode)

Steps 117–127 illustrate the sequence of events in Mode 0 or the download mode. Mode 0 allows a host processor 27 to configure the intelligent bridge 43 while the processor 44 is held in reset. The host processor 27 configures the PCI-to-PCI bridge 62 by assigning bus numbers, allocating PCI address space, and assigning interrupt request numbers (IRQ numbers). The memory controller (not shown) and the ATU 63 can be initialized also by the host processor 27. The program code (i.e., boot code or initialization software) for the local processor 44 may be downloaded into local memory (not shown) from the host processor 27. This local memory is coupled to the local processor bus 7 via a memory controller. For example, the program code may be downloaded from the main memory (not shown) to the local memory, which is coupled to the intelligent bridge 43.

The host processor 27 clears the local processor 44 reset by clearing the Local Processor Reset in the EBCR. This de-asserts the reset signal, provided to the local processor 44, and the local processor 44 begins its initialization process. This initialization mode (i.e., the download mode), does not allow private PCI devices on the secondary PCI bus 45 without custom firmware since private devices on the secondary PCI bus 45 require that the ATU 63 and the PCI-to-PCI Bridge 62 be initialized with a special configuration before the system BIOS configures the secondary PCI bus. For additional information concerning private devices, please refer to pending application, Ser. No. 08/490,775, entitled "Method and Apparatus for Enabling Intelligent I/O Subsystems Using PCI I/O Devices", assigned to the same assignee as the present invention.

Mode 1 (User Defined External Master Mode

Steps 131 and 133 of FIG. 6 illustrate the sequence of events in a mode 1 configuration reset mode.

Mode 1 allows an external agent to initialize the intelligent bridge 43 when P_RST# 25 is asserted, the local processor 44 is held in reset, and the host processor 27 is prevented from initializing the intelligent bridge 43 through the primary PCI bus 9 by the Retry circuitry 59.

In this mode, an external agent has the opportunity to initialize the intelligent bridge 43. The external agent may either clear the reset condition on the local processor 44 by clearing the Local Processor Reset Bit in the EBCR or enable the intelligent processor 43 to begin receiving configuration cycles by clearing the Configuration Cycle Disable bit in the EBCR.

Mode 2 (Default Mode)

Mode 2 (steps 137, 139) allows each unit of the intelligent bridge 43 to be initialized in its own manner. All units are reset when the P-RST# signal 25 is asserted. Each unit returns to its default state. This mode is similar to the prior art approaches in that a reset sequence is not guaranteed. In other words race conditions may exist between the local processor 44 operation after reset and a PCI configuration cycle, initiated by the host processor 27.

Mode 3 (Configuration Mode)

Steps 141–151 of FIG. 6 illustrate the sequence of events for the configuration mode (mode 3). Mode 3 allows the local processor 44 to initialize and control the initialization process before the host processor 27 is allowed to configure the intelligent bridge 43. For additional details concerning the initialization process for the 80960 JF processor, please refer to the i960 Jx Microprocessor User's Manual. As an implementation note, Mode 3 is available only if the 80960 JF processor Initial Memory Image (IMI) is properly loaded into memory at a correct predetermined location.

The host processor 27 is prevented from initializing the intelligent bridge 43 by the Retry circuit 59. During this time, the Retry circuitry 59 signals a Retry on all PCI cycles it receives until the local processor 44 has cleared the Configuration Cycle Disable Bit in the EBCR.

By allowing the local processor 44 to control the initialization process, it is possible to initialize the PCI configuration registers to values other than the default power-up values. Certain PCI configuration registers that are read only through PCI configuration cycle are read/write from the local processor. This allows a programmer to customize the way the intelligent bridge 43 appears to the PCI configuration software (e.g., appearing as a networking device).

Figure 7:
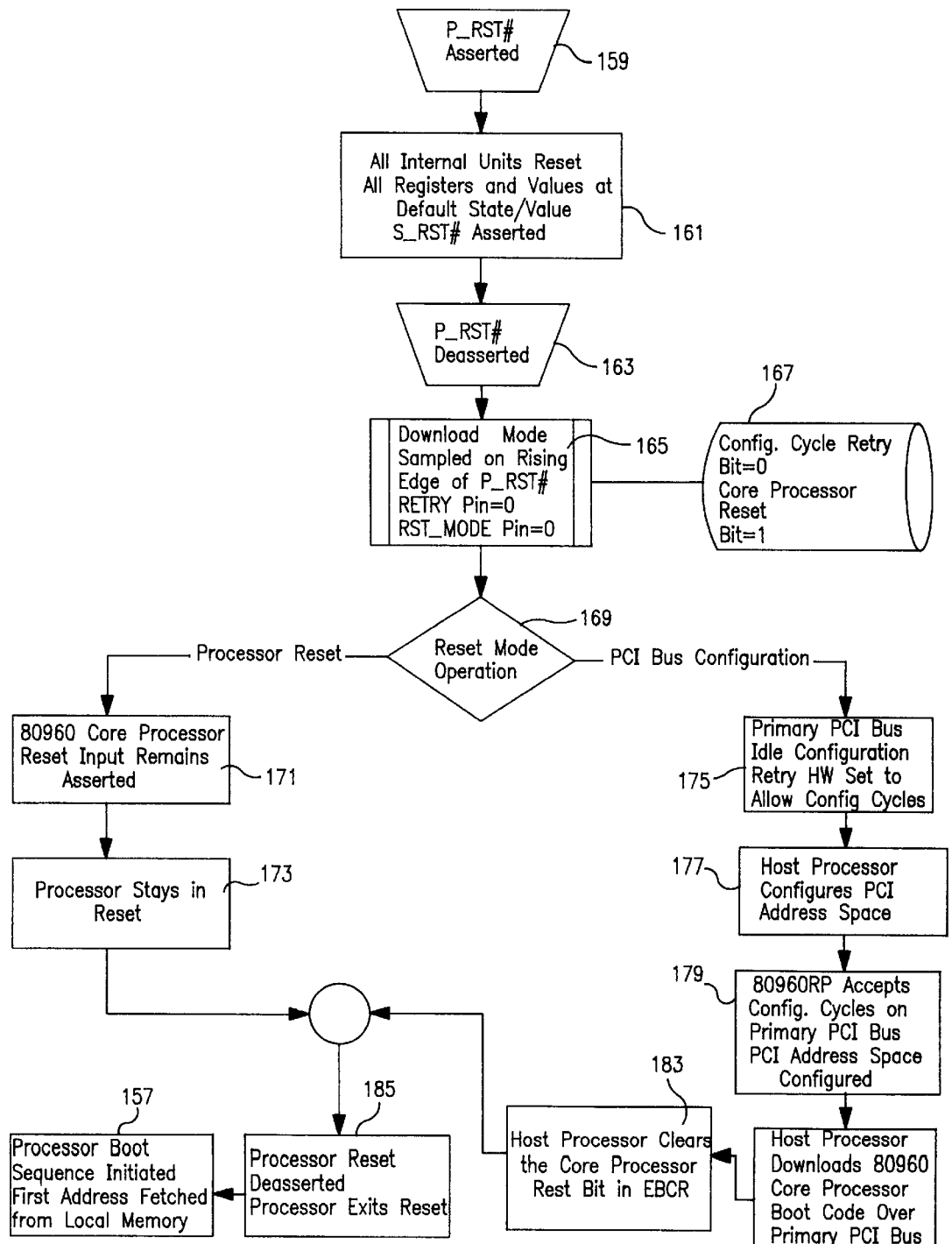
FIG. 7 illustrates a flowchart of the sequence of events in the download mode (Mode 0).

FIG. 7 illustrates in further detail the sequence of events for the download mode.

Figure 8:
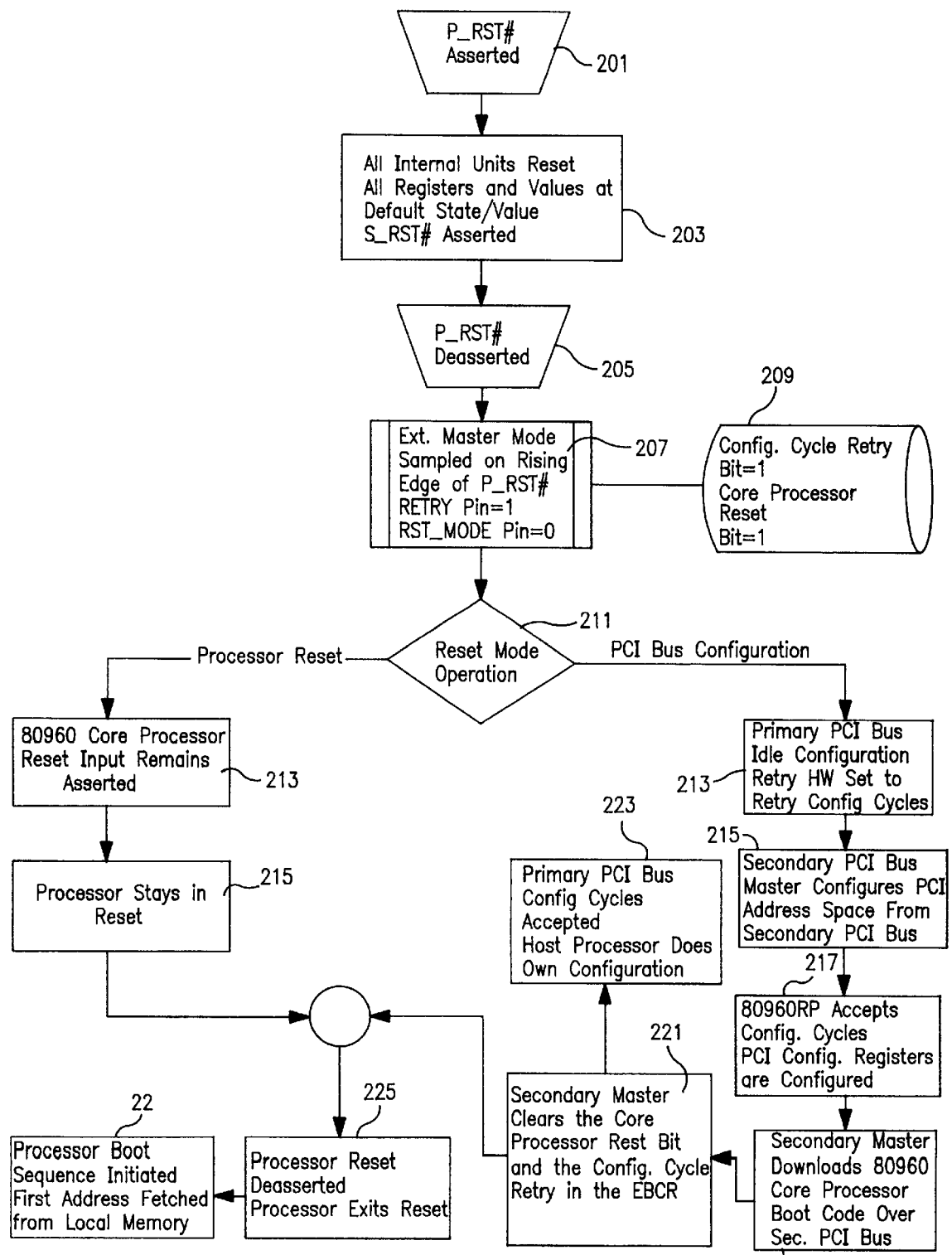
FIG. 8 illustrates a flowchart of the sequence of events in the user define/external master mode (Mode 1).

FIG. 8 illustrates additional details of the sequence of events in the user defined/external master mode.

Figure 9:
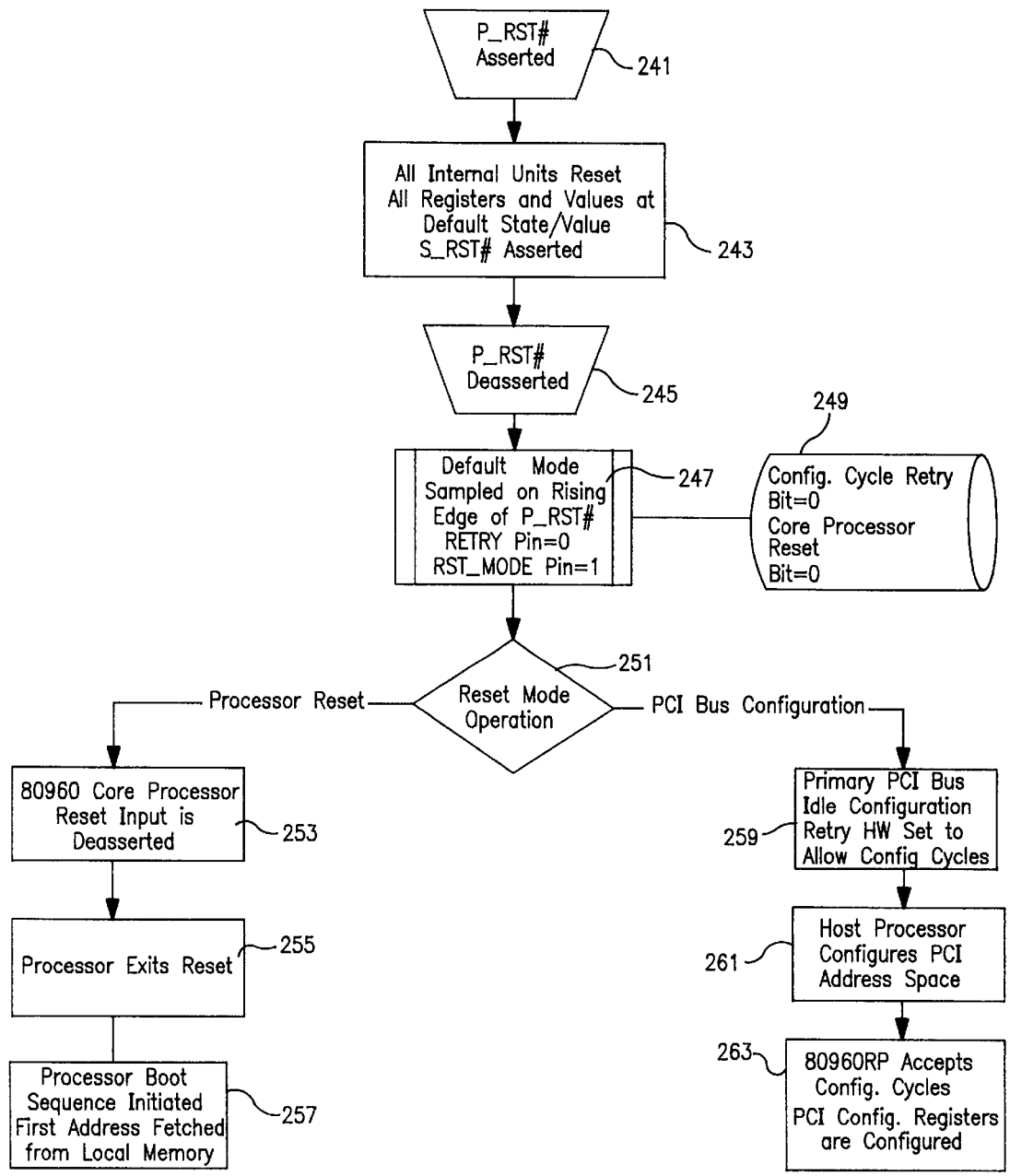
FIG. 9 illustrates a flowchart of the sequence of events for reset configuration mode 2.

FIG. 9 illustrates additional details concerning the sequence of events in a default mode.

Figure 10:
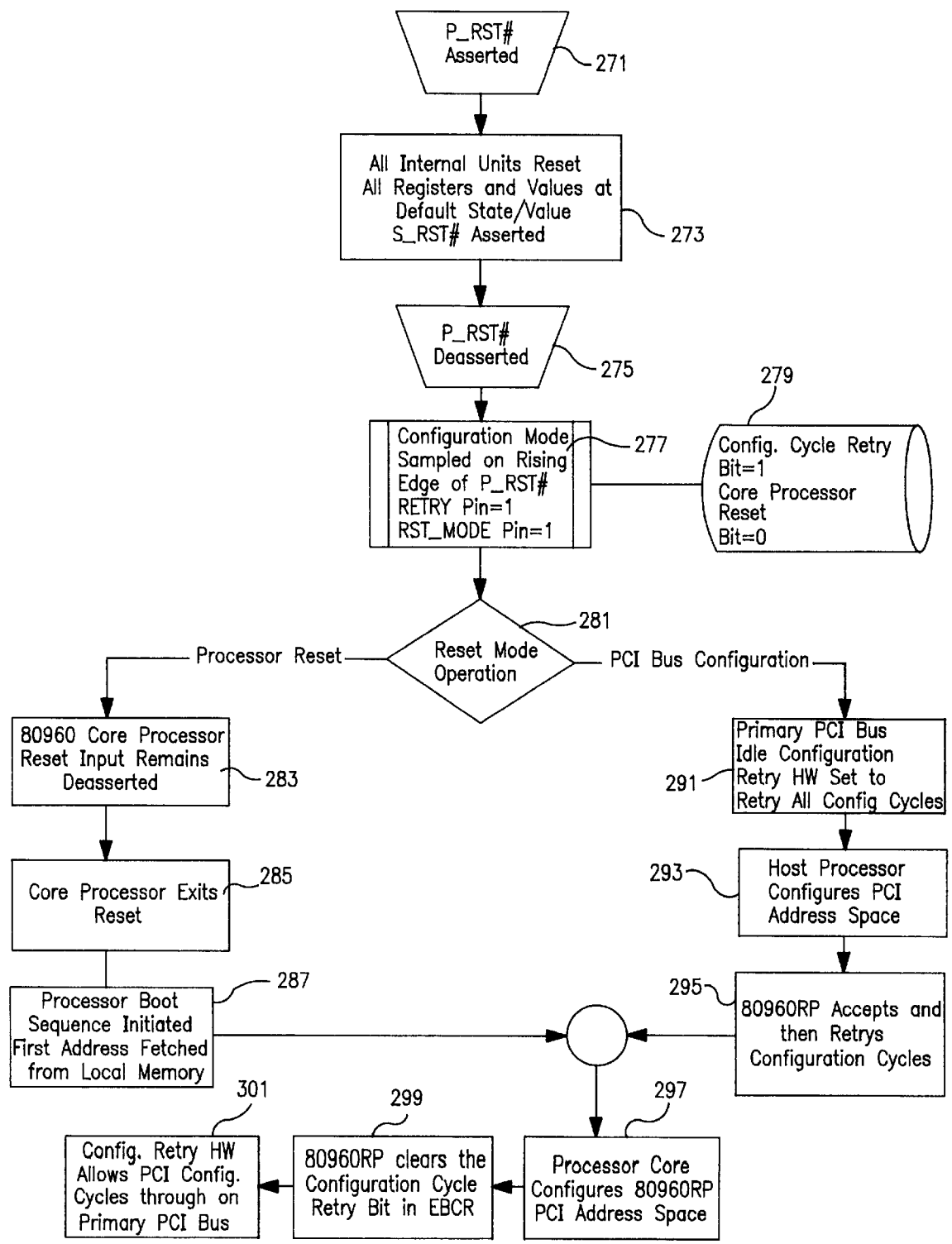
FIG. 10 illustrates a flowchart of the sequence of events in the configuration mode (Mode 3).

FIG. 10 illustrates additional details of the sequence of events in the configuration mode.

Figure 11:
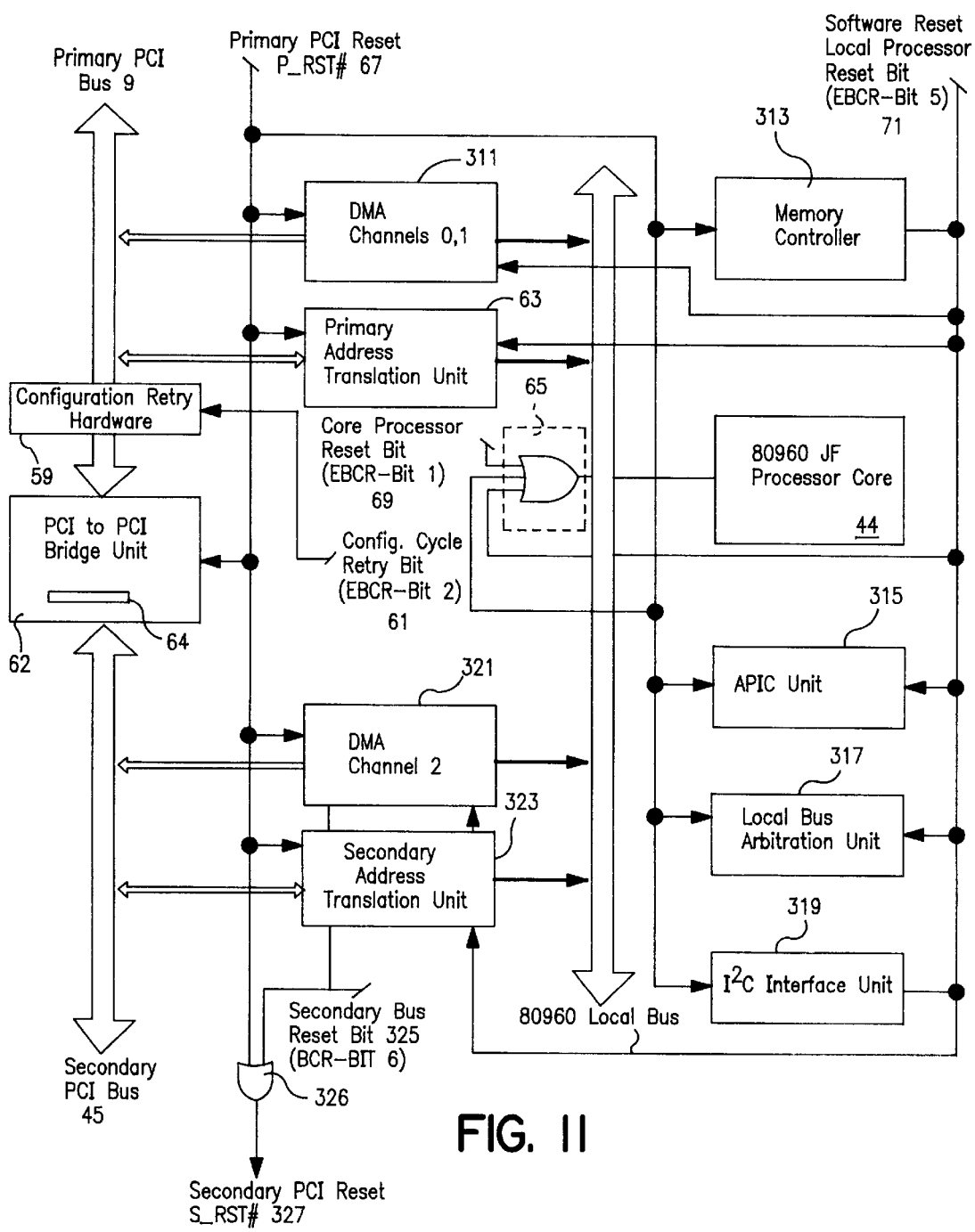
FIG. 11 illustrates a preferred embodiment of the present invention in an intelligent bridge, configured in an Intel Architecture.

FIG. 11 illustrates an exemplary implementation of the present invention in Intel Architecture (IA). FIG. 11 illustrates the functional units of the 80960 JF processor (herein referred to as a "80960 RP"). The Retry circuitry 59 is integrated into the 80960 RP. The Retry circuitry 59 may be implemented as part of the ATU 63 or the PCI-to-PCI bridge unit 62. The Extended Bridge Control Register (EBCR) may be disposed in the PCI-to-PCI bridge unit 62. The Retry circuitry 65 is coupled to the local processor (i.e., the 80960 JF Core) 44. The Retry circuitry is provided a Core Processor Reset Bit (EBCR 1), the P_RST# signal 67, and a software controlled Reset Local Processor Reset Bit (EBCR-bit 5). The Retry circuitry 59 is also provided a Configuration Cycle Retry Bit (EBCR[2]) 61. The reset circuitry 65 provides a signal to the JF Core 44 that places the local processor 44 into reset.

The P_RST# signal 67 is also provided to a Secondary PCI Reset Generator 326 for generating a Secondary PCI Reset signal (S_RST#) 327. The Secondary PCI Reset Generator 326 is also provided a Secondary Bus Reset Bit (BCR[6]) 325.

Other functional blocks such as a memory controller 313, the APIC unit 315, a local bus arbitration unit 317, I²C interface unit 319, first and second DMA units (311 and 321), and a secondary address translation unit 323 are illustrated in FIG. 11. However, these units are not particularly relevant to the present invention. For further details concerning the architecture of the 80960 RP chip, please see pending application, entitled "Architecture for an I/O Processor that Integrates a PCI to PCI Bridge" Ser. No. 08/490, 654, assigned to the same assignee as this application.

A variety of hardware and software functions have been described herein. Depending upon the implementation, many of the hardware functions may be emulated using software. Likewise, software functions may be performed using hardware components having hardwired circuitry configured to perform the functions. In other implementations, some of the hardware or software functions may be configured using firmware or other computer system implementation technologies.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

It is claimed:

1. An intelligent bridge comprising:
   a) a retry circuit coupled to a first external bus for receiving a retry signal, and responsive thereto, generating retry cycles onto the first external bus; and
   b) a reset circuit, coupled to a local processor, for receiving a reset signal, and responsive thereto, resetting the local processor, said reset circuit performs one of bringing the local processor into reset and keeping the local processor in reset, when the reset signal is asserted and bringing the local processor out of reset when the reset signal is not asserted;
   wherein the retry circuit and the reset circuit provide multiple configuration modes for the intelligent bridge.

2. The intelligent bridge as set forth in claim 1 wherein the retry circuit accepts configuration cycles from a host processor when a Retry signal is not asserted and generates Retry cycles onto the first external bus and blocks configuration cycles when the Retry signal is asserted.

3. The intelligent bridge as set forth in claim 1 wherein the Retry signal is a first bit in a command register having a plurality of bits.

4. The intelligent bridge of claim 1 wherein the reset signal is a second bit in the command register.

5. The intelligent bridge of claim 1 wherein the first external bus is compliant to a PCI bus protocol.

6. The intelligent bridge of claim 1 wherein the reset circuit is further provided with a PCI reset signal, and the reset circuit in response to an asserted PCI reset signal resets the local processor.

7. The intelligent bridge of claim 1 wherein the reset circuit is further provided with a software controlled reset signal and the reset circuit in response to an asserted controlled reset signal resets the local processor.

8. The intelligent bridge of claim 1 wherein the reset circuit is an OR gate provided with the PCI reset signal, the software controlled reset signal, and the reset signal as inputs and generating a reset signal as an output.

9. A method comprising the steps of:
   (a) receiving a reset signal;
   (b) receiving a retry signal;
   (c) determining if said reset signal is active;
   (d) if yes, determining if the retry signal is active,
      (i) if yes, holding a local processor in reset mode and allowing configuration cycles of the host processor to configure an intelligent bridge;
      (ii) if no, blocking configuration cycles of a host processor and allowing an external agent to configure the intelligent bridge;
   (e) if no, determining whether the retry signal is active,
      (i) if yes, allowing the host processor to access the intelligent bridge;
      (ii) if no, blocking configuration cycles of the host processor and allowing the local processor to configure the intelligent bridge.

10. The method in claim 9 further comprising the steps of:
    (a) configuring a memory controller;
    (b) configuring an address translation unit;
    (c) downloading a program code for said local processor; and
    (d) releasing said local processor from said reset mode.

11. The method in claim 9 wherein the step of if no, blocking configuration cycles of a host processor and allowing an external agent to configure the intelligent bridge further comprises the steps of:
    (a) allowing said external agent to configure a memory controller;
    (b) allowing said external agent to configure an address translation unit;
    (c) allowing said external agent to download a program code for said local processor; and
    (d) allowing said external agent to release said local processor from said reset mode.

12. The method in claim 9 further comprising the steps of configuring a memory controller and an address translation unit.

13. The method in claim 9 wherein the step of if no, blocking configuration cycles of the host processor and allowing the local processor to configure the intelligent bridge further comprises the steps of:
    (a) allowing said local processor to configure a memory controller;
    (b) allowing said local processor to configure an address translation unit;
    (c) allowing said local processor to download a program code for said local processor; and
    (d) allowing said local processor to disable retry mode signal.

* * * * *